(12) United States Patent
Luo et al.

(10) Patent No.: US 12,174,322 B2
(45) Date of Patent: Dec. 24, 2024

(54) F-P SENSOR PROBE, ABSOLUTE DISTANCE MEASUREMENT DEVICE, AND ABSOLUTE DISTANCE MEASUREMENT METHOD

(71) Applicant: THE INSTITUTE OF OPTICS AND ELECTRONICS, THE CHINESE ACADEMY OF SCIENCES, Sichuan (CN)

(72) Inventors: Xiangang Luo, Sichuan (CN); Tiancheng Gong, Sichuan (CN); Chengwei Zhao, Sichuan (CN); Yanqin Wang, Sichuan (CN); Guiyuan Jia, Sichuan (CN); Yanwu Chu, Sichuan (CN); Changtao Wang, Sichuan (CN)

(73) Assignee: THE INSTITUTE OF OPTICS AND ELECTRONICS, THE CHINESE ACADEMY OF SCIENCES, Sichuan (CN)

( * ) Notice: Subject to any disclaimer, the term of this patent is extended or adjusted under 35 U.S.C. 154(b) by 0 days.

(21) Appl. No.: 18/575,779

(22) PCT Filed: Dec. 5, 2022

(86) PCT No.: PCT/CN2022/136612
§ 371 (c)(1),
(2) Date: Dec. 29, 2023

(87) PCT Pub. No.: WO2024/113394
PCT Pub. Date: Jun. 6, 2024

(65) Prior Publication Data
US 2024/0264285 A1    Aug. 8, 2024

(30) Foreign Application Priority Data
Dec. 1, 2022    (CN) .......................... 202211534663.2

(51) Int. Cl.
*G01C 3/08*  (2006.01)
*G01S 7/481* (2006.01)
*G01S 17/08* (2006.01)

(52) U.S. Cl.
CPC ............ *G01S 7/4818* (2013.01); *G01S 17/08* (2013.01)

(58) Field of Classification Search
CPC .............................. G01S 7/4818; G01S 17/08
See application file for complete search history.

(56) References Cited

U.S. PATENT DOCUMENTS

2020/0200646 A1   6/2020  Neilson et al.
2023/0044124 A1*  2/2023  Sun ...................... G01N 29/225

FOREIGN PATENT DOCUMENTS

CA      2552465 A1    1/2018
CN   104197844 A     12/2014
(Continued)

OTHER PUBLICATIONS

WIPO/ISA/CNIPA, "International Search Report and Written Opinion" issued on Jun. 28, 2023 in PCT/CN2022/136612, 7 pages.
(Continued)

*Primary Examiner* — Mark Hellner
(74) *Attorney, Agent, or Firm* — J. Peter Paredes; Amin Wasserman Gurnani LLP

(57) ABSTRACT

Provided are an F-P sensor probe, an absolute distance measurement device, and an absolute distance measurement method, which relate to the field of non-contact absolute distance measurement technologies. This structure includes a first N+1-core multimode optical fiber probe (9), an optical fiber sleeve (10), an imaging lens group (11), and a reference lens (12), wherein: the first N+1-core multimode optical fiber probe (9), the imaging lens group (11), and the reference lens (12) are sequentially fixed inside the optical fiber (Continued)

sleeve (10) along a direction of the F-P sensor probe toward a sample (8); and the first N+1-core multimode optical fiber probe (9) includes N first multimode optical fibers (16) and one second multimode optical fiber (17), where N≥2, and the N first multimode optical fibers (16) are arranged around the second multimode optical fiber (17).

19 Claims, 6 Drawing Sheets

(56) References Cited

FOREIGN PATENT DOCUMENTS

| | | | |
|---|---|---|---|
| CN | 110849274 A | 2/2020 | |
| CN | 111060916 A | 4/2020 | |
| CN | 114931358 A | 8/2022 | |
| CN | 217276022 U | 8/2022 | |
| EP | 3163340 A1 * | 11/2015 | ............ G01D 5/268 |
| JP | 2007198771 A | 8/2007 | |

OTHER PUBLICATIONS

CNIPA, First Office Action issued in priority application CN202211534663.2, Jun. 13, 2024, 8 pages.
CNIPA, First search report of priority application CN202211534663.2, Jun. 13, 2024, 1 pages.

* cited by examiner

F-P SENSOR PROBE, ABSOLUTE DISTANCE MEASUREMENT DEVICE, AND ABSOLUTE DISTANCE MEASUREMENT METHOD

CROSS-REFERENCE TO RELATED APPLICATIONS

The present application claims priority to PCT application serial no. PCT/CN2022/136612, which claims priority to Chinese Patent Application No. 202211534663.2, filed with the Chinese Patent Office on Dec. 1, 2022, entitled "F-P Sensor Probe, Absolute Distance Measurement Device, and Absolute Distance Measurement Method", their entireties of which is incorporated herein by reference.

TECHNICAL FIELD

The present disclosure relates to the field of non-contact absolute distance measurement technologies and, in particular, to an F-P sensor probe, an absolute distance measurement device, and an absolute distance measurement method.

BACKGROUND ART

Non-contact absolute distance measurement is widely used in positioning for precision stage, detection for focal plane position, topography detection for super-smooth surface, detection for step height, etc. Especially in the semiconductor process, when processing a nano pattern using the photolithography technology, it is necessary to monitor, in real time, the position of the focal plane of a silicon wafer with high precision and feed it back to the precision stage for closed-loop control. In the near-field optical storage technology, it is necessary to measure the spacing between a head and a disc for near-field optical storage with high precision. In the super-smooth surface topography detection technology, it is necessary to monitor, in real time, the absolute distance between a reference lens and a surface to be measured. In the inspection of geometric dimensions of parts, it is necessary to accurately measure step topography.

Currently, the commonly used detectors include laser triangulation reflective sensors, spectral confocal sensors, laser displacement sensors, capacitive sensors, etc. All of these detectors can achieve high-precision measurement of distances, but only the spectral confocal sensors and the capacitive sensors can achieve direct measurement of absolute distances, and other detectors need to calibrate the initial positions to achieve the measurement of absolute distances and exhibit poor repeatability during light interruption. Moreover, the spectral confocal sensors have low measurement resolution although they have good repeatability during light interruption, and the capacitive sensors are susceptible to parasitic capacitance and have significant thermal drift effects.

SUMMARY

In view of the above problems, the present disclosure provides an optical fiber F-P (Fabry-Perot) sensor probe structure, an absolute distance measurement device, and an absolute distance measurement method.

A first aspect of the present disclosure provides an F-P sensor probe, comprising a first N+1-core multimode optical fiber probe, an optical fiber sleeve, an imaging lens group, and a reference lens, wherein: the first N+1-core multimode optical fiber probe, the imaging lens group, and the reference lens are sequentially fixed inside the optical fiber sleeve along a direction of the F-P sensor probe toward a sample; the first N+1-core multimode optical fiber probe comprises N first multimode optical fibers and one second multimode optical fiber, where N≥2, and the N first multimode optical fibers are arranged around the second multimode optical fiber.

According to an embodiment of the present disclosure, when a surface of the sample has a reflectivity greater than or equal to 40%, the F-P sensor probe further comprises a film layer inside the window, and the film layer inside the window is attached to a surface of the reference lens.

According to an embodiment of the present disclosure, the film layer inside the window is a metal film layer with a transmittance of 40%+5% and a reflectivity of 15%+5%, and preferably, the metal film layer includes a metallic chromium layer with a thickness of 4 to 8 nm.

According to an embodiment of the present disclosure, the reference lens is quartz glass with a thickness greater than or equal to 5 mm and a PV of the surface topography less than or equal to $\lambda/20$, where $\lambda$ is a wavelength at which an interferometer measures the surface topography of the reference lens.

According to an embodiment of the present disclosure, the second multimode optical fiber is disposed at a central position of the first N+1-core multimode optical fiber probe, and the N first multimode optical fibers are arranged annularly at an equal spacing $\Delta d_1$ around the second multimode optical fiber.

According to an embodiment of the present disclosure, each of the N first multimode optical fibers is in a tangential relationship to the second multimode optical fiber.

According to an embodiment of the present disclosure, both a core diameter $d_1$ of the first multimode optical fibers and a core diameter de of the second multimode optical fiber are standard core diameters, and $d_2$ is greater than or equal to $d_1$; and the spacing $\Delta d_1$ between the two adjacent first multimode optical fibers satisfies $0 \leq \Delta d_1 \leq d_1/2$.

According to an embodiment of the present disclosure, the number of the first multimode optical fibers is determined according to the following formula:

$$N = \frac{\pi}{\arccos\left(\frac{d_1 + \Delta d_1}{d_1 + d_2}\right)}$$

where N is the number of the first multimode optical fibers.

A second aspect of the present disclosure provides an absolute distance measurement device using the F-P sensor probe described above, comprising: the F-P sensor probe, an F-P sensor connector, a second N+1-core multimode optical fiber, a 1×2 optical fiber coupler, a N-core multimode optical fiber, a single-core multimode optical fiber, an illuminating fiber connector, a receiving fiber connector, an illuminating light source, and a demodulating system, wherein the first N+1-core multimode optical fiber probe of the F-P sensor probe is connected to the F-P sensor connector; one end of the F-P sensor connector that is far away from the F-P sensor probe is connected sequentially with the second N+1-core multimode optical fiber and a first end of the 1×2 optical fiber coupler, and a second end of the 1×2 optical fiber coupler is connected to the N-core multimode optical fiber and the single-core multimode optical fiber, respectively; the N-core multimode optical fiber is connected to the illuminating fiber connector, the single-core multimode optical fiber is connected to the receiving fiber connector, the illuminating fiber connector is connected to the illuminating light source, the receiving fiber connector is connected to the demodulating system, the illuminating light source is configured to emit a light, and the demodulating system is configured to obtain an absolute distance between the sample and the F-P sensor probe.

According to an embodiment of the present disclosure, the first multimode optical fibers in the F-P sensor probe are linked with the illuminating fiber connector; and the second multimode optical fiber in the F-P sensor probe is linked with the receiving fiber connector.

According to an embodiment of the present disclosure, the illuminating light source includes a halogen light source, an LED, an SLD, and a supercontinuum laser light source; and the demodulating system includes a spectrometer and an fiber optic F-P demodulator and is configured to acquire and analyze interference light intensity signals at different distances.

A third aspect of the present disclosure provides an absolute distance measurement method using the absolute distance measurement device described above, comprising steps of: providing an input light path, in which light emitted from the illuminating light source is coupled into a branch where the illuminating fiber connector is located, exits through the N first multimode optical fibers in the first N+1-core multimode optical fiber probe into the F-P sensor probe, and then converges in an air gap between the reference lens and the sample; providing a reflected light path, in which light rays are reflected by the surfaces of the reference lens and the sample and then pass through the F-P sensor probe again, converge, for the second time, through the second multimode optical fiber in the first N+1-core multimode optical fiber probe, and finally reach the receiving fiber connector; and providing a distance calculating module to analyze an optical signal received by the receiving fiber connector and calculate the absolute distance between the sample and the F-P sensor probe.

According to an embodiment of the present disclosure, the providing of an input light path specifically comprises steps of: causing the light emitted from the illuminating light source to be coupled into the illuminating fiber connector, then pass sequentially through the N-core multimode optical fiber, the 1×2 optical fiber coupler, and the second N+1-core multimode optical fiber to the F-P sensor probe, exit from the N first multimode optical fibers in the first N+1-core multimode optical fiber probe, then be transmitted sequentially through the imaging lens group and the reference lens, and then converge, for the first time, in the air gap between the reference lens and the sample.

According to an embodiment of the present disclosure, the providing of an reflected light path specifically comprises steps of: causing the light reflected by the surfaces of the reference lens and the sample to be transmitted sequentially through the reference lens and the imaging lens group, and then converged, for the second time, at the second multimode optical fiber in the first N+1-core multimode optical fiber probe and coupled into the second multimode optical fiber; causing an optical signal carrying information on the absolute distance in the air gap to pass sequentially through the second N+1-core multimode optical fiber, the 1×2 optical fiber coupler, and the single-core multimode optical fiber and then reach the receiving fiber connector.

According to an embodiment of the present disclosure, the providing of an distance calculating module specifically comprises steps of: receiving and analyzing the optical signal by the demodulating system to obtain a thickness of the air gap between the reference lens and the sample, whereby the absolute distance between the sample and the F-P sensor probe is calculated.

According to an embodiment of the present disclosure, the absolute distance between the sample and the F-P sensor probe is calculated by using the following operations: regarding the reference lens and the sample as an F-P cavity according to the theory of the multi-beam interference with a parallel-plate, and computing a reflection coefficient of the F-P cavity; computing a simulated reflectivity of the F-P cavity from the reflection coefficient, and establishing a model library of simulated reflectivities of the F-P cavity corresponding to the air gap at different thicknesses; computing an actually measured reflectivity of the F-P cavity; performing an operation of cross-correlating the actually measured reflectivity with a plurality of simulated reflectivities in the model library, and determining the thickness of the air gap corresponding to the simulated reflectivity with the highest correlation as the absolute distance between the sample and the F-P sensor probe.

According to an embodiment of the present disclosure, the reflection coefficient of the F-P cavity is computed according to the following formula:

$$\tilde{r}^t = \frac{r_1^t + r_1^t r_2^t e^{-2i\delta_1}}{1 + r_1^t r_2^t e^{-2i\delta_1}} \quad (t = s, \ p)$$

in the formula, s and p represent a s-wave and a p-wave, respectively; $r_1^t$ represents a reflection coefficient at an interface between the reference lens and the air gap corresponding to a t-wave; $r_2^t$ represents a reflection coefficient at an interface between the air gap and the sample corresponding to the t-wave; $\delta_1$ represents a phase shift of the light in the reference lens and in the air gap due to a change in optical path; and $\tilde{r}^t$ represents the reflection coefficient of the F-P cavity corresponding to the t-wave;

specifically, $r_1^t$, $r_2^t$(t=s, p) is computed according to the following formulas:

$$r_m^s = \frac{n_{m-1}\cos\theta_{m-1} - n_m\cos\theta_m}{n_{m-1}\cos\theta_{m-1} + n_m\cos\theta_m}(m = 1, 2)$$

$$r_m^p = \frac{n_m\cos\theta_{m-1} - n_{m-1}\cos\theta_m}{n_m\cos\theta_{m-1} + n_{m-1}\cos\theta_m}(m = 1, 2)$$

in the formula, $n_0$, $n_1$, and $n_2$ represent refractive indices of the reference lens, the air gap, and the sample, respectively; $\theta_0$ and $\theta_1$ represent an incident angle and a refraction angle of incident light emitted from the first multimode optical fibers on a lower surface of the reference lens, respectively; $\theta_2$ represents an angle of refraction of the incident light on an upper surface of the sample; $r_m^s$ and $r_m^p$ represent reflection coefficients of the s-wave and the p-wave at an interface between two media with refractive indices of $n_{m-1}$ and $n_m$ in a case where light beams are obliquely incident thereon, respectively.

According to an embodiment of the present disclosure, the $\delta_1$ is computed according to the following formula:

$$\delta_1 = \frac{2\pi c_1 n_1 \cos\theta_1}{\lambda}$$

where $c_1$ is the thickness of the air gap; and $\lambda$ is a wavelength of a spectrum emitted from a test light source.

According to an embodiment of the present disclosure, a film layer inside the window is attached to the surface of the reference lens, and the reflection coefficient of the F-P cavity is computed according to the following formula:

$$\tilde{r}^t = \frac{r_1^t + r_1^t r_2^t r_3^t e^{-2i\delta_2} + r_2^t e^{-2i\delta_1} + r_3^t e^{-2i(\delta_1+\delta_2)}}{1 + r_2^t r_3^t e^{-2i\delta_2} + r_1^t r_2^t e^{-2i\delta_1} + r_1^t r_3^t e^{-2i(\delta_1+\delta_2)}} \quad (t=s, p)$$

in the formula, s and p represent a s-wave and a p-wave, respectively; $r_1^t$ represents a reflection coefficient at an interface between the reference lens and the film layer inside the window corresponding to a t-wave; $r_2^t$ represents a reflection coefficient at an interface between the film layer inside the window and the air gap corresponding to the t-wave; $r_3^t$ represents a reflection coefficient at an interface between the air gap and the sample corresponding to the t-wave; $\delta_1$ and $\delta_2$ represent phase shifts of the light in the film layer inside the window and in the air gap due to a change in optical path, respectively; and $\tilde{r}^t$ represents the reflection coefficient of the F-P cavity corresponding to the t-wave; specifically, $r_1^t$, $r_2^t$, $r_3^t$ (t=s, p) is computed according to the following formulas:

$$r_m^s = \frac{n_{m-1}\cos\theta_{m-1} - n_m\cos\theta_m}{n_{m-1}\cos\theta_{m-1} + n_m\cos\theta_m} \quad (m=1, 2, 3)$$

$$r_m^p = \frac{n_m\cos\theta_{m-1} - n_{m-1}\cos\theta_m}{n_m\cos\theta_{m-1} + n_{m-1}\cos\theta_m} \quad (m=1, 2, 3)$$

in the formula, $n_0$, $n_1$, $n_2$, and $n_s$ represent refractive indices of the reference lens, the film layer inside the window, the air gap, and the sample, respectively; $\theta_0$ and $\theta_1$ represent an incident angle and a refraction angle of incident light emitted from the first multimode optical fibers on an upper surface of the film layer inside the window, respectively; $\theta_2$ represents an angle of refraction of the incident light on a lower surface of the film layer inside the window; $\theta_3$ represents an angle of refraction of the incident light on an upper surface of the sample; $r_m^s$ and $r_m^p$ represent reflection coefficients of the s-wave and the p-wave at an interface between two media with refractive indices of $n_{m-1}$ and $n_m$ in a case where light beams are obliquely incident thereon, respectively.

According to an embodiment of the present disclosure, the $\delta_1$ and $\delta_2$ are respectively computed according to the following formula:

$$\delta_m = \frac{2\pi c_m n_m \cos\theta_m}{\lambda} \quad (m=1, 2)$$

where $c_1$ and $c_2$ are the thicknesses of the film layer inside the window and the air gap, respectively; and $\lambda$ is a wavelength of a spectrum emitted from a test light source.

According to an embodiment of the present disclosure, the simulated reflectivity of the F-P cavity is computed according to the following formula:

$$R_{sim} = \frac{1}{2}(|\tilde{r}^s|^2 + |\tilde{r}^p|^2)$$

where $R_{sim}$ represents the simulated reflectivity of the F-P cavity; and $\tilde{r}^s$ and $\tilde{r}^p$ represent the reflection coefficients of the F-P cavity for the s-wave and the p-wave, respectively.

According to an embodiment of the present disclosure, the actually measured reflectivity of the F-P cavity is computed according to the following formula:

$$R_{exp} = \frac{I_{sample} - I_{dark}}{I_{ref} - I_{dark}} \cdot R_{ref}$$

where $R_{exp}$ represents the actually measured reflectivity of the F-P cavity; $I_{sample}$ represents an intensity of reflected light from the sample; $I_{dark}$ represents an intensity of stray light; $I_{ref}$ represents a reference light intensity; and $R_{ref}$ represents a reflectivity correction coefficient;

specifically, $R_{ref}$ is computed by the following formula:

$$R_{ref} = r_{12} + t_{12}^2 \cdot r'$$

where $r_{12}$ and $t_{12}$ represent a reflection coefficient and a transmission coefficient of the reference lens, respectively; and r' represents a reflection coefficient at an interface between the air gap and the sample.

According to an embodiment of the present disclosure, a film layer inside the window is attached to the surface of the reference lens, and the actually measured reflectivity of the F-P cavity is computed according to the following formula:

$$R_{exp} = \frac{I_{sample} - I_{dark}}{I_{ref} - I_{dark}} \cdot R_{ref}$$

where $R_{exp}$ represents the actually measured reflectivity of the F-P cavity; $I_{sample}$ represents an intensity of reflected light from the sample; $I_{dark}$ represents an intensity of stray light; $I_{ref}$ represents a reference light intensity; and $R_{ref}$ represents a reflectivity correction coefficient;

specifically, $R_{ref}$ is computed by the following formula:

$$R_{ref} = r_{13} + t_{13}^2 \cdot r'$$

where $r_{13}$ and $t_{13}$ represent a reflection coefficient and a transmission coefficient of the film layer inside the window, respectively; and r' represents a reflection coefficient at an interface between the air gap and the sample.

The F-P sensor probe, the absolute distance measurement device, and the absolute distance measurement method according to the present disclosure have at least the following beneficial effects as compared with the prior art:

In the present disclosure, a measurement of an absolute distance between a sensor probe and a surface to be measured is achieved based on the theory of optical fiber Fabry-Perot (F-P) interferometry, which has the characteristics of high precision, high resolution, good repeatability during light interruption, non-contact, etc., and enables the measurement of the absolute distance without calibration.

BRIEF DESCRIPTION OF DRAWINGS

The above and other objects, features, and advantages of the present disclosure will become more apparent from the following description of the embodiments of the present disclosure with reference to the accompanying drawings. In the drawings.

DESCRIPTION OF REFERENCE SIGNS

1. F-P sensor connector; 2. illuminating fiber connector; 3. receiving fiber connector; 4. second N+1-core multimode optical fiber; 5. N-core multimode optical fiber; 6. single-core multimode optical fiber; 7. 1×2 optical fiber coupler; 8. sample;
9. first N+1-core multimode optical fiber probe; 10. optical fiber sleeve; 11. imaging lens group; 12. reference lens; 13. film layer inside the window; 14. reflected light rays from sample; 15. reflected light rays from reference lens; 16. first multimode optical fiber; 17. second multimode optical fiber; 18. air gap;
19. incident light; 20. reflected light from reference lens; 21. reflected light from sample.

DETAILED DESCRIPTION OF EMBODIMENTS

The present disclosure will be described below in further detail in connection with specific embodiments and with reference to the accompanying drawings, in order to further clarify the objects, technical solutions, and advantages of the present disclosure. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed.

The terms used herein are intended only to describe specific embodiments and are not intended to limit the present disclosure. The terms "comprising", "including", and the like used herein indicate the presence of the specified features, steps, operations, and/or components, but do not exclude the presence or addition of one or more other features, steps, operations, or components.

In the present disclosure, the terms such as "mount", "link", "connect", and "fix" should be understood in a broad sense unless otherwise expressly specified or defined. For example, connection may be fixed connection or detachable connection or integral connection, may be mechanical connection or electric connection or mutual communication, or may be direct connection or indirect linking via an intermediate medium or internal communication between two elements or mutual interaction between two elements. The specific meanings of the above-mentioned terms in the present disclosure can be understood by those of ordinary skill in the art according to specific situations.

All terms (including technical and scientific terms) used herein have meanings commonly understood by those skilled in the art, unless otherwise defined. It should be noted that the terms used herein should be interpreted as having meanings consistent with the context of this specification and should not be interpreted in an idealized or overly rigid manner.

First Embodiment

Figure 1:
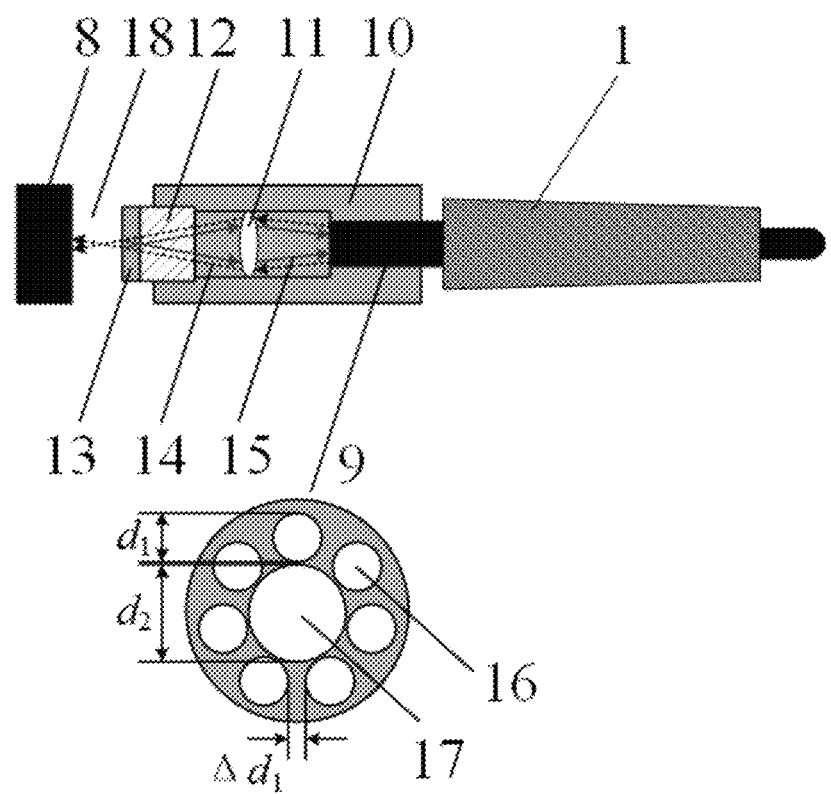
FIG. 1 schematically shows an overall diagram of an F-P sensor probe according to a first embodiment of the present disclosure.

FIG. 1 schematically shows an overall diagram of an F-P sensor probe according to the first embodiment of the present disclosure.

As shown in FIG. 1, the first embodiment of the present disclosure provides an F-P sensor probe, comprising a first N+1-core multimode optical fiber probe 9, an optical fiber sleeve 10, an imaging lens group 11, and a reference lens 12. The F-P sensor probe is disposed between a sample 8 and an F-P sensor connector 1 for measurement of an absolute distance.

Here, the first N+1-core multimode optical fiber probe 9, the imaging lens group 11, and the reference lens 12 are sequentially fixed inside the optical fiber sleeve 10 along a direction of the F-P sensor probe toward the sample 8; the first N+1-core multimode optical fiber probe 9 comprises N first multimode optical fibers 16 and one second multimode optical fiber 17, where N≥2, and the N first multimode optical fibers 16 are arranged around the second multimode optical fiber 17. The first N+1-core multimode optical fiber probe 9 is connected to the F-P sensor connector 1.

It should be noted that, in general, the surface of the reference lens 12 is flush with the outer end surface of the optical fiber sleeve 10, and the distance between the sensor and the sample 8 to be measured can be adjusted by moving the F-P sensor probe. However, due to the limitation of the precision of the actual machining, the reference lens 12 and the optical fiber sleeve 10 cannot be made absolutely flush with each other. Preferably, the surface of the reference lens 12 protrudes from the outer end surface of the optical fiber sleeve 10 to ensure non-existence of another additional air gap between the sample 8 and the reference lens 12, which additional air gap would be located between the surface of the reference lens 12 and the end surface of the optical fiber sleeve 10 and generated as the reference lens 12 is recessed into the end surface of the optical fiber sleeve 10. This additional space gap would affect the accuracy of measurement of a value of an air gap 18 to be measured by the sensor.

In an embodiment of the present disclosure, the air gap 18 in which a distance is to be measured is between the sample 8 and the reference lens 12. When the surface of the sample 8 has a reflectivity greater than or equal to 40%, the F-P sensor probe further comprises a film layer inside the window 13, and the film layer inside the window 13 is attached to the surface of the reference lens 12. In this case, the air gap 18 is located between the sample 8 and the film layer inside the window 13. In test, due to the difference in samples 8, specifically difference in reflectivity thereof, the reference lenses used in conjunction therewith may be divided into reference lenses with film layer inside the windows 13 and reference lenses without film layer inside the windows 13, and the reference lens 12 may be replaced according to the actual status of the sample 8.

The film layer inside the window 13 is attached to the surface of the reference lens 12 and is typically made by a magnetron sputtering method, and its optical parameters should be determined according to the reflectivity of the surface of the sample 8 to be measured. Specifically, if the reflectivity of the surface of the sample 8 is less than 40%, the film layer inside the window 13 is typically not needed. If the reflectivity of the surface of the sample 8 is greater than or equal to 40%, the film layer inside the window 13 is typically a metal film layer with a transmittance of 40%+5% and a reflectivity of 15%+5%. Preferably, the metal film layer may include, for example, a metallic chromium layer with a thickness of 4 to 8 nm.

In an embodiment of the present disclosure, the reference lens 12 is quartz glass with a thickness greater than or equal to 5 mm and a PV of the surface topography less than or equal to $\lambda/20$, where $\lambda$ is a wavelength at which an interferometer measures the surface topography of the reference lens 12, and specifically refers to a wavelength used by an interferometer when measuring the surface topography of the quartz glass with the interferometer.

In an embodiment of the present disclosure, the second multimode optical fiber 17 is disposed at a central position of the first N+1-core multimode optical fiber probe 9, and the N first multimode optical fibers 16 are arranged annularly at an equal spacing $\Delta d_1$ around the second multimode optical fiber 17.

Further, each of the N first multimode optical fibers 16 is in a tangential relationship to the second multimode optical fiber 17.

Generally, both the core diameter $d_1$ of the N first multimode optical fibers 16 and the core diameter $d_e$ of the one second multimode optical fiber 17 are standard core diameters (e.g., 105/125 µm, 200/220 µm, or the like), and $d_2$ is greater than or equal to $d_1$. Moreover, the spacing $\Delta d_1$ between the two adjacent first multimode optical fibers 16 satisfies $0 \leq \Delta d_1 \leq d_1/2$, in order to achieve continuous annular light illumination.

Generally, the number N of the first multimode optical fibers 16 may be determined from $d_1$, $d_2$, and $\Delta d_1$ and may be specifically computed by the following formula:

$$N = \frac{\pi}{\arccos\left(\frac{d_1 + \Delta d_1}{d_1 + d_2}\right)}$$

For example, when $d_1$ is equal to 125 µm and $d_2$ is equal to 220 µm, $\Delta d_1$ is less than or equal to 62.5 µm, a range of $8.47 \geq N \geq 5.47$ is obtained by computation by substituting them into the above formula, and a range of $8 \geq N \geq 6$ is obtained after rounding.

Second Embodiment

Figure 2:
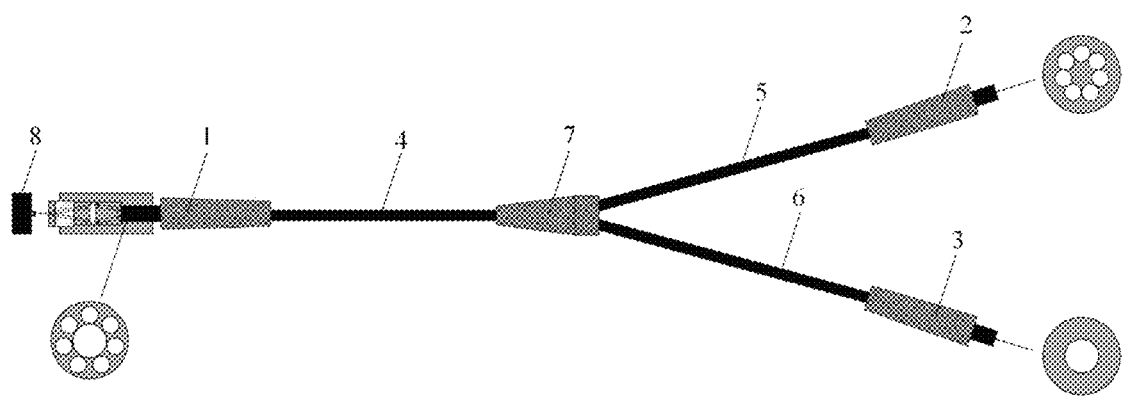
FIG. 2 schematically shows a structural diagram of an absolute distance measurement device according to a second embodiment of the present disclosure.

FIG. 2 schematically shows a structural diagram of an absolute distance measurement device according to the second embodiment of the present disclosure.

As shown in FIG. 2, the second embodiment of the present disclosure provides an absolute distance measurement device using the F-P sensor probe of the first embodiment described above, comprising: the F-P sensor probe, an F-P sensor connector 1, a second N+1-core multimode optical fiber 4, a 1×2 optical fiber coupler 7, a N-core multimode optical fiber 5, a single-core multimode optical fiber 6, an illuminating fiber connector 2, a receiving fiber connector 3, an illuminating light source, and a demodulating system.

Here, the first N+1-core multimode optical fiber probe 9 of the F-P sensor probe is connected to the F-P sensor connector 1; one end of the F-P sensor connector 1 that is far away from the F-P sensor probe is connected sequentially with the second N+1-core multimode optical fiber 4 and a first end of the 1×2 optical fiber coupler 7, and a second end of the 1×2 optical fiber coupler 7 is connected to the N-core multimode optical fiber 5 and the single-core multimode optical fiber 6, respectively. The N-core multimode optical fiber 5 is connected to the illuminating fiber connector 2, the single-core multimode optical fiber 6 is connected to the receiving fiber connector 3, the illuminating fiber connector 2 is connected to the illuminating light source, the receiving fiber connector 3 is connected to the demodulating system, the illuminating light source is configured to emit a light, and the demodulating system is configured to obtain an absolute distance between the sample 8 and the F-P sensor probe.

With continued reference to FIG. 2, the first multimode optical fibers 16 in the F-P sensor probe are linked with the illuminating fiber connector 2 sequentially through the second N+1-core multimode optical fiber 4, the 1×2 optical fiber coupler 7, and the N-core multimode optical fiber 5, and the second multimode optical fiber 17 in the F-P sensor probe is linked with the receiving fiber connector 3 sequentially through the second N+1-core multimode optical fiber 4, the 1×2 optical fiber coupler 7, and the single-core multimode optical fiber 6.

Specifically, the illuminating light source includes, but is not limited to, a halogen light source, an LED, an SLD, and a supercontinuum laser light source. The demodulating system includes, but is not limited to, a spectrometer and an fiber optic F-P demodulator and is configured to acquire and analyze interference light intensity signals at different distances.

With the above embodiment, the present disclosure enables the measurement of the absolute distance between the F-P sensor probe and the sample 8. The illuminating fiber connector 2 is linked with an illuminating light source with a wide spectrum. The receiving fiber connector 3 is linked with the demodulating system, which can acquire and analyze the interference light intensity signals at different distances.

Third Embodiment

The third embodiment of the present disclosure provides an absolute distance measurement method using the absolute distance measurement device of the second embodiment described above, comprising the steps of:
providing an input light path, in which light emitted from the illuminating light source is coupled into a branch where the illuminating fiber connector 2 is located, exits through the N first multimode optical fibers 16 in the first N+1-core multimode optical fiber probe 9 into the F-P sensor probe, and then converges in the air gap 18 between the reference lens 12 and the sample 8;

providing a reflected light path, in which light rays are reflected by the surfaces of the reference lens 12 and the sample 8 and then pass through the F-P sensor probe again, converge, for the second time, through the second multimode optical fiber 17 in the first N+1-core multimode optical fiber probe 9, and finally reach the receiving fiber connector 3; and providing a distance calculating module to analyze an optical signal received by the receiving fiber connector 3 and calculate the absolute distance between the sample 8 and the F-P sensor probe.

In an embodiment of the present disclosure, the provision of the input light path specifically comprises the steps of:

causing the light emitted from the illuminating light source to be coupled into the illuminating fiber connector 2, then pass sequentially through the N-core multimode optical fiber 5, the 1×2 optical fiber coupler 7, and the second N+1-core multimode optical fiber 4 to the F-P sensor probe, exit from the N first multimode optical fibers 16 in the first N+1-core multimode optical fiber probe 9, then be transmitted sequentially through the imaging lens group 11 and the reference lens 12, and then converge, for the first time, in the air gap 18 between the reference lens 12 and the sample 8 (see reflected light rays 14 from the sample in FIG. 1).

In an embodiment of the present disclosure, the provision of the reflected light path specifically comprises the steps of:

causing the light rays to be reflected by the surfaces of the reference lens 12 and the sample 8 and then pass through the F-P sensor probe again (see reflected light rays 15 from the reference lens in FIG. 1), and converge, for the second time, at the second multimode optical fiber 17 in the first N+1-core multimode optical fiber probe 9; and causing an optical signal carrying information on the absolute distance in the air gap 18 to pass sequentially through the second N+1-core multimode optical fiber 4, the 1×2 optical fiber coupler 7, and the single-core multimode optical fiber 6 and then reach the receiving fiber connector 3.

In an embodiment of the present disclosure, the provision of the distance calculating module specifically comprises the steps of: receiving and analyzing the optical signal by the demodulating system to obtain the thickness of the air gap 18, i.e., the absolute distance between the sample 8 and the F-P sensor probe.

The specific calculation process performed by the distance calculating module will be described below in detail.

In the last step of the above steps, the thickness of the air gap 18 between the reference lens 12 and the sample 8 is calculated by using a theory of the multi-beam white-light interferometry method with a parallel-plate, and a multilayer film system structure can be established. The multilayer film system structure comprises the reference lens 12, the air gap 18, and the sample 8 disposed from top to bottom.

Here, incident light 19 emitted from the first multimode optical fibers 16 with a core diameter $d_1$ reaches the upper and lower surfaces of the reference lens 12, where one part thereof is directly reflected to form reflected light 20 from the reference lens 12, and the other part thereof is transmitted to reach the upper surface of the sample 8 through the air gap 18, is then reflected again to reach the reference lens 12 as reflected light 21 from the sample, and is finally received by the second multimode optical fiber 17 with a core diameter $d_2$.

According to the theory of the multi-beam interference with a parallel-plate, an F-P cavity is formed by the reference lens 12 and the sample 8. It is assumed that the incident light 19 is respectively incident at an angle $\theta_0$ and refracted at an angle $\theta_1$ on the lower surface of the reference lens 12 and is refracted at an angle $\theta_2$ on the upper surface of the sample, the refractive indices of the reference lens 12, the air gap 18, and the sample 8 are denoted as $n_0$, $n_1$, and $n_2$, respectively, and $r_m^s$ and $r_m^p$ represent reflection coefficients of a s-wave and a p-wave at the interface between two media with refractive indices of $n_{m-1}$ and $n_m$ in a case where light beams are obliquely incident thereon, respectively. The thickness of the air gap 18 is denoted as $c_1$. As such, the multilayer film system structure is completely established.

Figure 3:
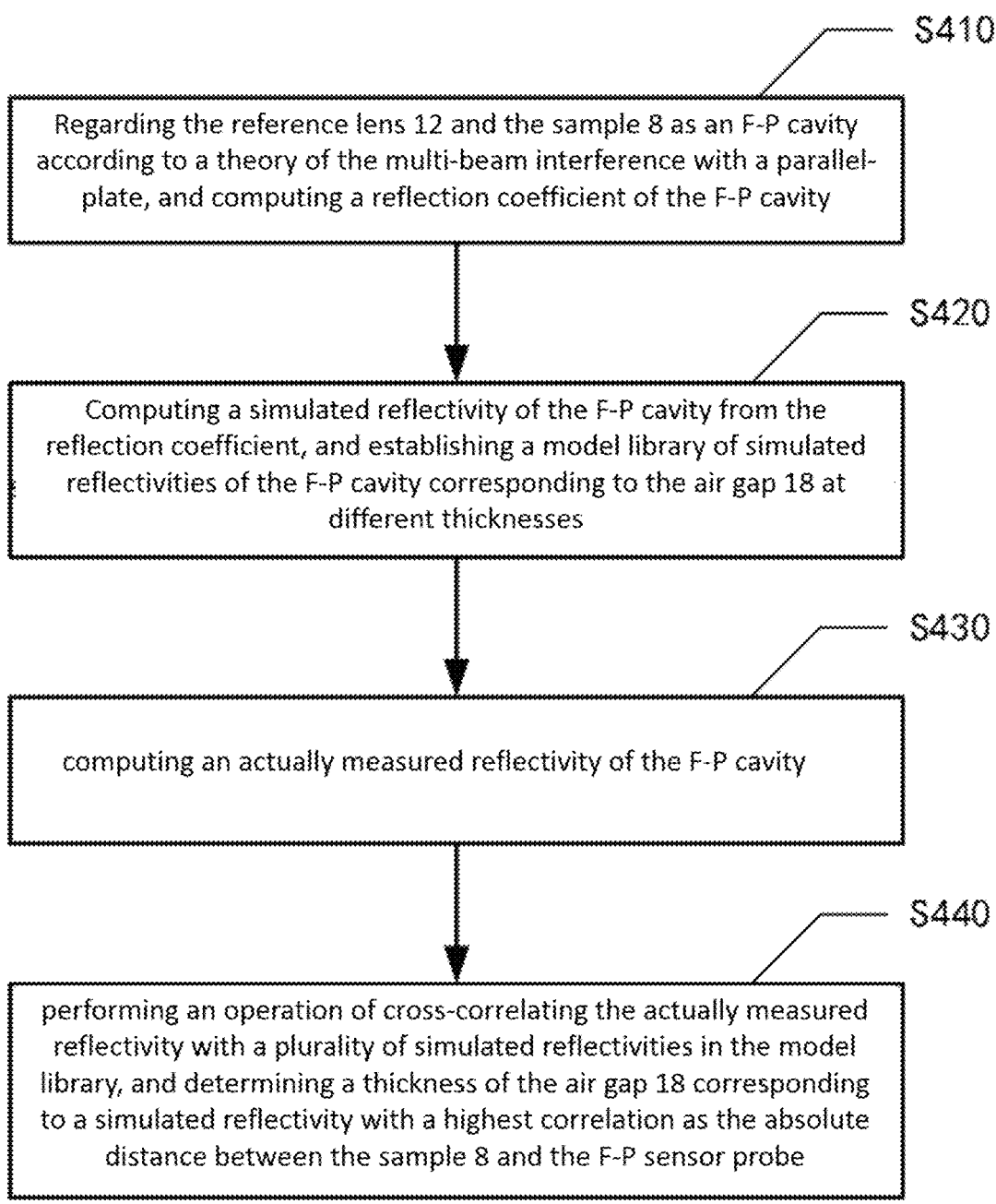
FIG. 3 schematically shows a flowchart for calculating an absolute distance according to a third embodiment of the present disclosure.

Based on the multilayer film system structure established above, FIG. 3 schematically shows a flowchart for calculating the absolute distance according to the third embodiment of the present disclosure.

As shown in FIG. 3, in an embodiment of the present disclosure, in the distance calculating module described above, the absolute distance between the sample 8 and the F-P sensor probe is calculated by using the following operation S410 to operation S440. In the operation S410, the reference lens 12 and the sample 8 are regarded as an F-P cavity according to the theory of the multi-beam interference with a parallel-plate, and a reflection coefficient of the F-P cavity is computed.

In an embodiment of the present disclosure, the reflection coefficient of the F-P cavity may be computed by the following formula:

$$\tilde{r}^t = \frac{r_1^t + r_1^t r_2^t e^{-2i\delta_1}}{1 + r_1^t r_2^t e^{-2i\delta_1}} \quad (t = s, p)$$

in the formula, s and p represent a s-wave and a p-wave, respectively; $r_1^t$ represents a reflection coefficient at the interface between the reference lens 12 and the air gap 18 corresponding to a t-wave; $r_2^t$ represents a reflection coefficient at the interface between the air gap 18 and the sample 8 corresponding to the t-wave; $\delta_1$ represents a phase shift of the light in the reference lens 12 and in the air gap 18 due to a change in optical path; and $\tilde{r}^t$ represents the reflection coefficient of the F-P cavity corresponding to the t-wave.

Specifically, $r_1^t, r_2^t$ (t=s, p) is computed according to the following formula:

$$r_m^s = \frac{n_{m-1}\cos\theta_{m-1} - n_m\cos\theta_m}{n_{m-1}\cos\theta_{m-1} + n_m\cos\theta_m} \quad (m = 1, 2)$$

$$r_m^p = \frac{n_m\cos\theta_{m-1} - n_{m-1}\cos\theta_m}{n_m\cos\theta_{m-1} + n_{m-1}\cos\theta_m} \quad (m = 1, 2)$$

in the formula, $n_0$, $n_1$, and $n_2$ represent the refractive indices of the reference lens 12, the air gap 18, and the sample 8, respectively; $\theta_0$ and $\theta_1$ represent an incident angle and a refraction angle of incident light 19 emitted from the first multimode optical fibers 16 on the lower surface of the reference lens 12, respectively; $\theta_2$ represents an angle of refraction of the incident light 19 on the upper surface of the sample 8; $r_m^s$ and $r_m^p$ represent reflection coefficients of the s-wave and the p-wave at the interface between two media with refractive indices of $n_{m-1}$ and $n_m$ in a case where light beams are obliquely incident thereon, respectively.

In an embodiment of the present disclosure, $\delta_1$ is computed according to the following formula:

$$\delta_1 = \frac{2\pi c_1 n_1 \cos\theta_1}{\lambda}$$

where $c_1$ is the thickness of the air gap 18; and $\lambda$ is a wavelength of a spectrum emitted from a test light source.

In the operation S420, a simulated reflectivity of the F-P cavity is computed from the reflection coefficient, and a model library of simulated reflectivities of the F-P cavity corresponding to the air gap 18 at different thicknesses is established.

In an embodiment of the present disclosure, the simulated reflectivity of the F-P cavity is computed according to the following formula:

$$R_{sim} = \frac{1}{2}(|\tilde{r}^s|^2 + |\tilde{r}^p|^2)$$

where $R_{sim}$ represents the simulated reflectivity of the F-P cavity; and $\tilde{r}^s$ and $\tilde{r}^p$ represent the reflection coefficients of the F-P cavity for the s-wave and the p-wave, respectively.

A model library of the simulated reflectivities $R_{sim}$ of the F-P cavity corresponding to the air gap 18 at different thicknesses $c_1$ may be established by reference to the above formula.

In the operation S430, an actually measured reflectivity of the F-P cavity is computed. In an embodiment of the present disclosure, the actually measured reflectivity of the F-P cavity is computed according to the following formula:

$$R_{exp} = \frac{I_{sample} - I_{dark}}{I_{ref} - I_{dark}} \cdot R_{ref}$$

where $R_{exp}$ represents the actually measured reflectivity of the F-P cavity; $I_{sample}$ represents the intensity of reflected light from the sample, typically the intensity of light outputted from the second multimode optical fiber 17 that carries information on the absolute distance in the air gap 18; $I_{dark}$ represents the intensity of stray light, typically the intensity of stray light directly received by the second multimode optical fiber 17, including the intensity of ambient stray light, and light emitted from the first multimode optical fibers 16 that directly enters the ambient environment without passing through the imaging lens group 11 and the reference lens 12; $I_{ref}$ represents a reference light intensity, typically the intensity of light outputted from the second multimode optical fiber 17 when the air gap 18 between the reference lens 12 and the sample 8 is greater than the measurable range of the F-P sensor probe, for example, 2.5 times the measurable range, where its specific value is selected according to experience and is not limited here; and $R_{ref}$ represents a reflectivity correction coefficient, typically the reflection coefficient when the air gap 18 between the reference lens 12 and the sample 8 is greater than the measurable range of the F-P sensor probe.

Specifically, $R_{ref}$ is computed by the following formula:

$$R_{ref} = r_{12} + t_{12}^2 \cdot r'$$

where $r_{12}$ and $t_{12}$ represent a reflection coefficient and a transmission coefficient of the reference lens 12, respectively; and $r'$ represents a reflection coefficient at the interface between the air gap 18 and the sample 8.

In the operation S440, an operation of cross-correlating the actually measured reflectivity with a plurality of simulated reflectivities in the model library is performed, and the thickness of the air gap 18 corresponding to the simulated reflectivity with the highest correlation is determined as the absolute distance between the sample 8 and the F-P sensor probe.

Fourth Embodiment

The fourth embodiment of the present disclosure provides an absolute distance measurement method using the absolute distance measurement device of the second embodiment described above. In this case, since the surface of the sample 8 has a reflectivity greater than or equal to 40%, the F-P sensor probe further comprises a film layer inside the window 13, and the measurement comprises the steps of:

providing an input light path, in which light emitted from the illuminating light source is coupled into a branch where the illuminating fiber connector 2 is located, exits through the N first multimode optical fibers 16 in the first N+1-core multimode optical fiber probe 9 into the F-P sensor probe, and then converges in the air gap 18 between the film layer inside the window 13 and the sample 8;

providing a reflected light path, in which light rays are reflected by the surfaces of the film layer inside the window 13 and the sample 8 and then pass through the F-P sensor probe again, converge, for the second time, through the second multimode optical fiber 17 in the first N+1-core multimode optical fiber probe 9, and finally reach the receiving fiber connector 3; and providing a distance calculating module to analyze an optical signal received by the receiving fiber connector 3 and calculate the absolute distance between the sample 8 and the F-P sensor probe.

In an embodiment of the present disclosure, the provision of the input light path specifically comprises the steps of:

causing the light emitted from the illuminating light source to be coupled into the illuminating fiber connector 2, then pass sequentially through the N-core multimode optical fiber 5, the 1×2 optical fiber coupler 7, and the second N+1-core multimode optical fiber 4 to the F-P sensor probe, exit from the N first multimode optical fibers 16 in the first N+1-core multimode optical fiber probe 9, then be transmitted sequentially through the imaging lens group 11, the reference lens 12, and the film layer inside the window 13, and then converge, for the first time, in the air gap 18 between the film layer inside the window 13 and the sample 8.

In an embodiment of the present disclosure, the provision of the reflected light path specifically comprises the steps of:

causing the light rays to be reflected by the surfaces of the film layer inside the window 13 and the sample 8 and then pass again through the film layer inside the window 13, the reference lens 12, and the imaging lens group 11, and then converged, for the second time, at the second multimode optical fiber 17 in the first N+1-core multimode optical fiber probe 9 and coupled into the second multimode optical fiber 17; and causing an optical signal carrying information on the absolute distance in the air gap 18 to pass sequentially through the second N+1-core multimode optical fiber 4, the 1×2 optical fiber coupler 7, and the single-core multimode optical fiber 6 and then reach the receiving fiber connector 3.

In an embodiment of the present disclosure, the provision of the distance calculating module specifically comprises the steps of: receiving and analyzing the optical signal by the demodulating system to obtain the thickness of the air gap 18 between the reference lens 12 and the sample 8, whereby the absolute distance between the sample 8 and the F-P sensor probe is calculated.

The specific calculation process performed by the distance calculating module will be described below in detail.

Figure 4:
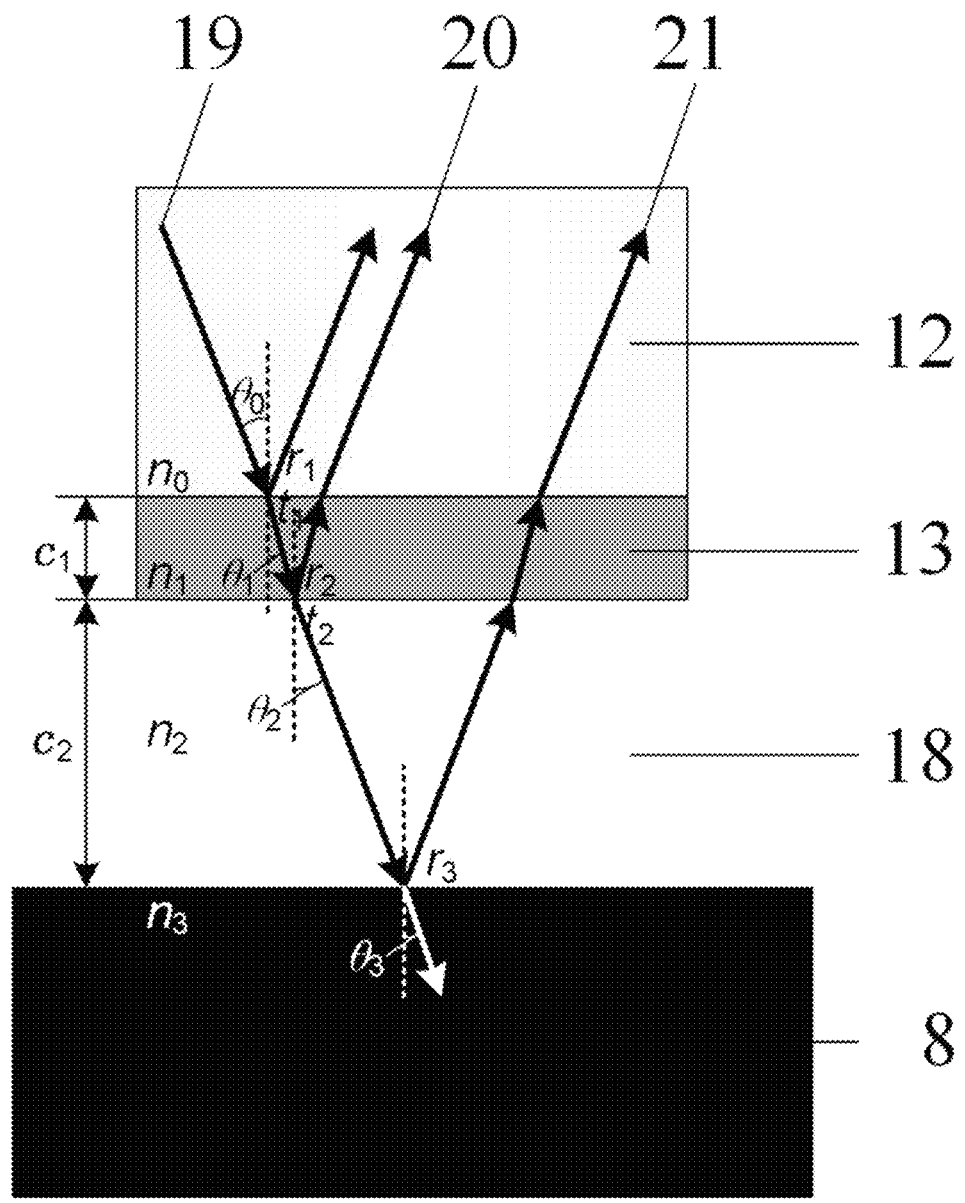
FIG. 4 schematically shows a schematic diagram of a multilayer film system structure according to a fourth embodiment of the present disclosure.

FIG. 4 schematically shows a schematic diagram of a multilayer film system structure according to the fourth embodiment of the present disclosure.

In the last step of the above steps, the thickness of the air gap 18 between the film layer inside the window 13 and the sample 8 is calculated by using a parallel-plate-based multi-beam white-light interferometry method, and a multilayer film system structure as shown in FIG. 4 can be established. The multilayer film system structure comprises the reference lens 12, the film layer inside the window 13, the air gap 18, and the sample 8 disposed from top to bottom.

Here, incident light 19 emitted from the first multimode optical fibers 16 with a core diameter $d_1$ reaches the upper and lower surfaces of the film layer inside the window 13 through the reference lens 12, where one part thereof is directly reflected to form reflected light 20 from the reference lens 12, and the other part thereof is transmitted to reach the upper surface of the sample 8 through the air gap 18, is then reflected again to reach the reference lens 12 through the film layer inside the window 13 as reflected light 21 from the sample, and is finally received by the second multimode optical fiber 17 with a core diameter $d_2$.

According to the theory of the multi-beam interference with a parallel-plate, an F-P cavity is formed by the film layer inside the window 13 and the sample 8. It is assumed that the incident light 19 is respectively incident at an angle $\theta_0$ and refracted at an angle $\theta_1$ on the upper surface of the film layer inside the window 13, is incident at an angle $\theta_1$ and refracted at an angle $\theta_2$ on the lower surface of the film layer inside the window 13, and is incident at an angle $\theta_2$ and refracted at an angle $\theta_3$ on the upper surface of the sample 8, the refractive indices of the reference lens 12, the film layer inside the window 13, the air gap 18, and the sample 8 are denoted as $n_0$, $n_1$, $n_2$, and $n_3$, respectively, a reflection coefficient and a transmission coefficient at the interface between the reference lens 12 and the film layer inside the window 13 are denoted as $r_1$ and $t_1$, respectively, a reflection coefficient and a transmission coefficient at the interface between the film layer inside the window 13 and the air gap 18 are denoted as $r_2$ and $t_2$, respectively, a reflection coefficient at the interface between the air gap 18 and the sample 8 is denoted as $r_3$, and the thicknesses of the film layer inside the window 13 and the air gap 18 are denoted as $c_1$ and $c_2$, respectively. As such, the multilayer film system structure is completely established.

Figure 5:
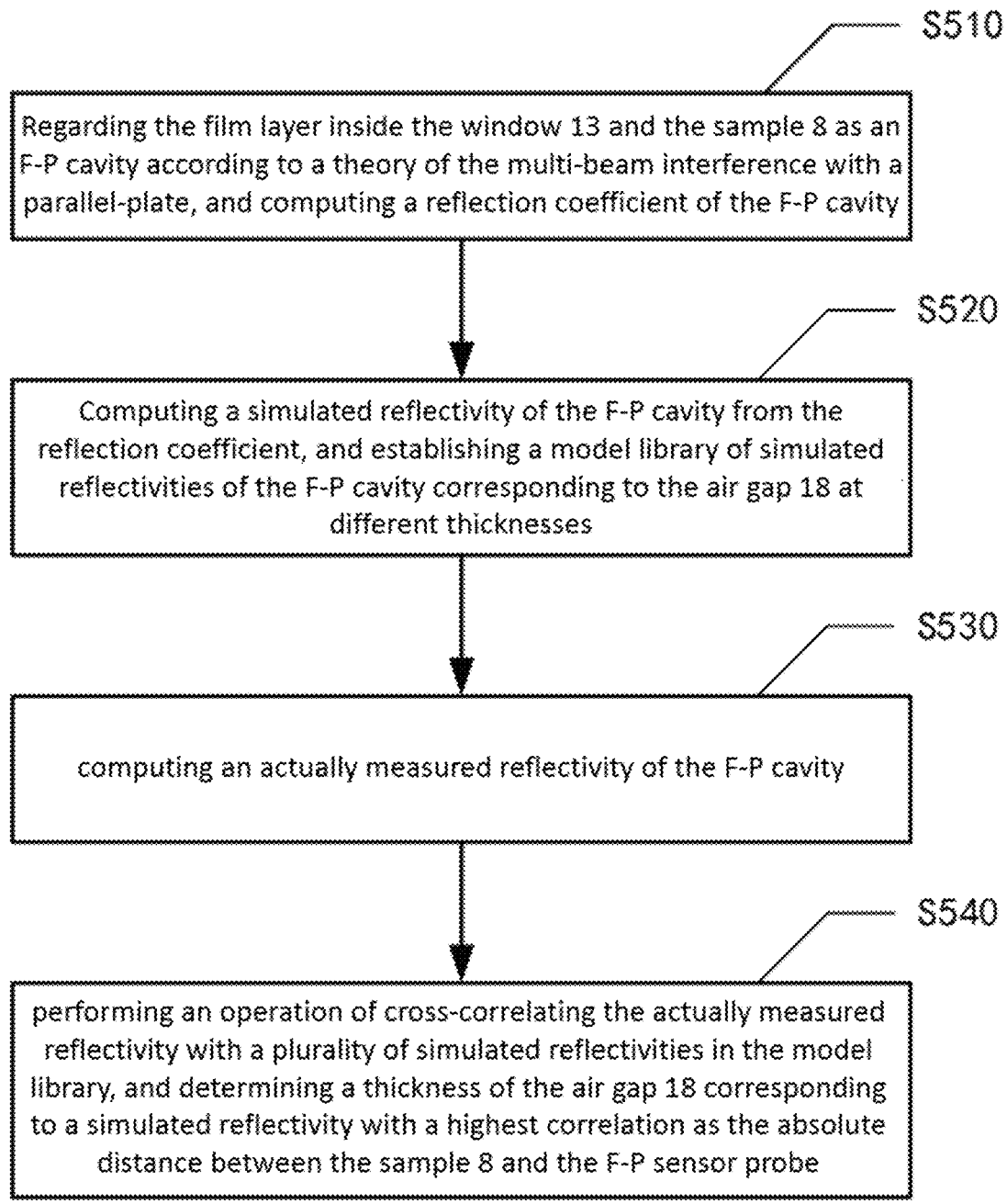
FIG. 5 schematically shows a flowchart for calculating an absolute distance according to the fourth embodiment of the present disclosure.

Based on the multilayer film system structure established above, FIG. 5 schematically shows a flowchart for calculating the absolute distance according to the fourth embodiment of the present disclosure.

As shown in FIG. 5 in combination with FIG. 4, in an embodiment of the present disclosure, in the distance calculating module described above, the absolute distance between the sample 8 and the F-P sensor probe is calculated by using the following operation S510 to operation S540.

In the operation S510, the film layer inside the window 13 and the sample 8 are regarded as an F-P cavity according to the theory of the multi-beam interference with a parallel-plate, and a reflection coefficient of the F-P cavity is computed.

In an embodiment of the present disclosure, the reflection coefficient of the F-P cavity may be computed by the following formula:

$$\tilde{r}^t = \frac{r_1^t + r_1^t r_2^t r_3^t e^{-2i\delta_2} + r_2^t e^{-2i\delta_1} + r_3^t e^{-2i(\delta_1+\delta_2)}}{1 + r_2^t r_3^t e^{-2i\delta_2} + r_1^t r_2^t e^{-2i\delta_1} + r_1^t r_3^t e^{-2i(\delta_1+\delta_2)}} (t = s, p)$$

in the formula, s and p represent a s-wave and a p-wave, respectively; $r_1^t$ represents a reflection coefficient at the interface between the reference lens 12 and the film layer inside the window 13 corresponding to a t-wave; $r_2^t$ represents a reflection coefficient at the interface between the film layer inside the window 13 and the air gap 18 corresponding to the t-wave; $r_3^t$ represents a reflection coefficient at the interface between the air gap 18 and the sample 8 corresponding to the t-wave; $\delta_1$ and $\delta_2$ represent phase shifts of the light in the film layer inside the window 13 and in the air gap 18 due to a change in optical path, respectively; and $\tilde{r}^t$ represents the reflection coefficient of the F-P cavity corresponding to the t-wave.

Specifically, $r_1^t, r_2^t, r_3^t$ (t=s, p) is computed according to the following formulas:

$$r_m^s = \frac{n_{m-1}\cos\theta_{m-1} - n_m\cos\theta_m}{n_{m-1}\cos\theta_{m-1} + n_m\cos\theta_m} (m = 1, 2, 3)$$

$$r_m^p = \frac{n_m\cos\theta_{m-1} - n_{m-1}\cos\theta_m}{n_m\cos\theta_{m-1} + n_{m-1}\cos\theta_m} (m = 1, 2, 3)$$

in the formula, $n_0$, $m_1$, $n_2$, and $n_3$ represent the refractive indices of the reference lens 12, the film layer inside the window 13, the air gap 18, and the sample 8, respectively; $\theta_0$ and $\theta_1$ represent an incident angle and a refraction angle of incident light 19 emitted from the first multimode optical fibers 16 on the upper surface of the film layer inside the window 13, respectively; $\theta_2$ represents an angle of refraction of the incident light 19 on the lower surface of the film layer inside the window 13; $\theta_3$ represents an angle of refraction of the incident light 19 on the upper surface of the sample 8; $r_m^s$ and $r_m^p$ represent reflection coefficients of the s-wave and the p-wave at the interface between two media with refractive indices of $n_{m-1}$ and $n_m$ in a case where light beams are obliquely incident thereon, respectively.

In an embodiment of the present disclosure, $\delta_1$ and $\delta_2$ are respectively computed by the following formula:

$$\delta_m = \frac{2\pi c_m n_m \cos\theta_m}{\lambda} (m = 1, 2)$$

where $c_1$ and $c_2$ are the thicknesses of the film layer inside the window 13 and the air gap 18, respectively; and $\lambda$ is a wavelength of a spectrum emitted from a test light source.

In the operation S520, a simulated reflectivity of the F-P cavity is computed from the reflection coefficient, and a model library of simulated reflectivities of the F-P cavity corresponding to the air gap 18 at different thicknesses is established.

In an embodiment of the present disclosure, the simulated reflectivity of the F-P cavity is computed according to the following formula:

$$R_{sim} = \frac{1}{2}(|\tilde{r}^s|^2 + |\tilde{r}^p|^2)$$

where $R_{sim}$ represents the simulated reflectivity of the F-P cavity; and $\tilde{r}^s$ and $\tilde{r}^p$ represent the reflection coefficients of the F-P cavity for the s-wave and the p-wave, respectively.

A model library of the simulated reflectivities $R_{sim}$ of the F-P cavity corresponding to the air gap 18 at different thicknesses C2 may be established by reference to the above formula.

In the operation S530, an actually measured reflectivity of the F-P cavity is computed.

In an embodiment of the present disclosure, the actually measured reflectivity of the F-P cavity is computed according to the following formula:

$$R_{exp} = \frac{I_{sample} - I_{dark}}{I_{ref} - I_{dark}} \cdot R_{ref}$$

where $R_{exp}$ represents the actually measured reflectivity of the F-P cavity; $I_{sample}$ represents the intensity of reflected light from the sample, typically the intensity of light outputted from the second multimode optical fiber 17 that carries information on the absolute distance in the air gap 18; $I_{dark}$ represents the intensity of stray light, typically the intensity of stray light directly received by the second multimode optical fiber 17, including the intensity of ambient stray light, and light emitted from the first multimode optical fibers 16 that directly enters the ambient environment without passing through the imaging lens group 11, the reference lens 12, and the film layer inside the window 13; ref represents a reference light intensity, typically the intensity of light outputted from the second multimode optical fiber 17 when the air gap 18 between the film layer inside the window 13 and the sample 8 is greater than the measurable range of the F-P sensor probe (for example, 2.5 times the measurable range, where its specific value is selected according to experience and is not limited here); and $R_{ref}$ represents a reflectivity correction coefficient, typically the reflection coefficient when the air gap 18 between the film layer inside the window 13 and the sample 8 is greater than the measurable range of the F-P sensor probe.

Specifically, $R_{ref}$ is computed by the following formula:

$$R_{ref} = r_{13} + t_{13}^2 \cdot r'$$

where $r_{13}$ and $t_{13}$ represent a reflection coefficient and a transmission coefficient of the film layer inside the window 13, respectively; and r' represents a reflection coefficient at the interface between the air gap 18 and the sample 8.

In the operation S540, an operation of cross-correlating the actually measured reflectivity with a plurality of simulated reflectivities in the model library is performed, and the thickness of the air gap 18 corresponding to the simulated reflectivity with the highest correlation is determined as the absolute distance between the sample 8 and the F-P sensor probe.

Figure 6:
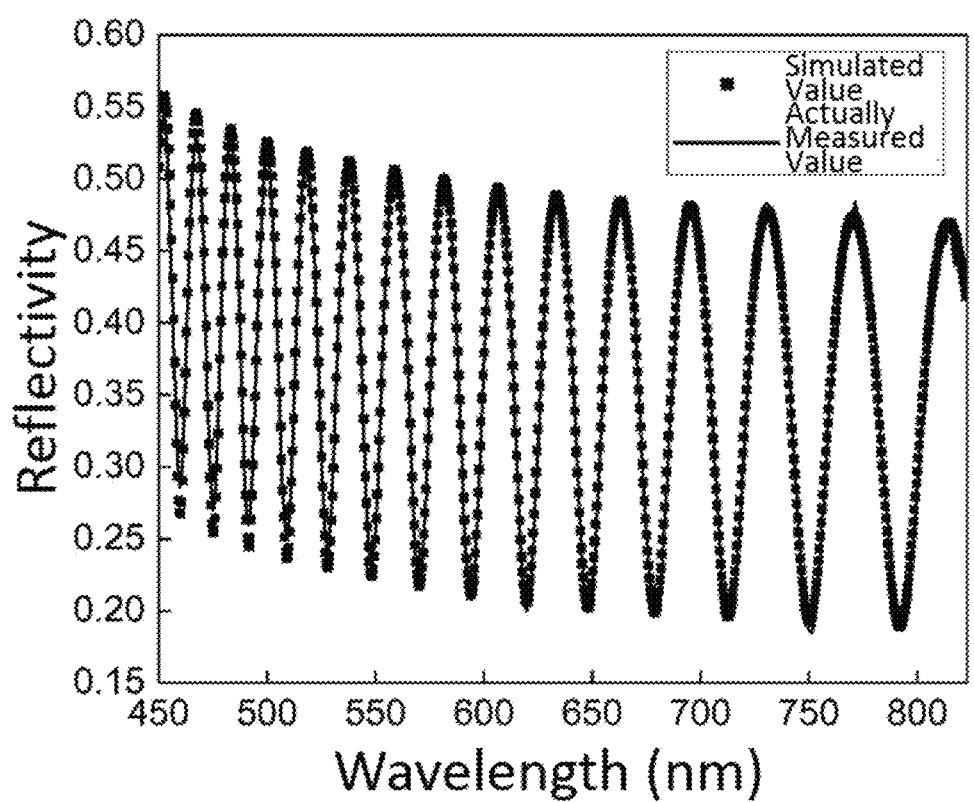
FIG. 6 schematically shows a comparison diagram of spectral curves of an actually measured reflectivity and a simulated reflectivity according to the third embodiment of the present disclosure.

FIG. 6 schematically shows a comparison diagram of spectral curves of the actually measured reflectivity and the simulated reflectivity according to the third embodiment of the present disclosure.

After the above process of calculating the absolute distance is carried out, the spectral curves of the typical simulated values (i.e., simulated reflectivity) and the actually measured values (i.e., actually measured reflectivity) are shown in FIG. 6. It can be seen that the simulated values are infinitely approximate to the actually measured values, indicating that the absolute distance measurement method using the absolute distance measurement device described above according to the third embodiment of the present disclosure enables the measurement of the absolute distance with high precision.

It can be seen from the above description that the F-P sensor probe, the absolute distance measurement device, and the absolute distance measurement method according to the above embodiments of the present disclosure have achieved at least the following technical effects.

In the present disclosure, a measurement of an absolute distance between a sensor probe and a surface to be measured is achieved based on the theory of optical fiber Fabry-Perot (F-P) interferometry, which has the characteristics of high precision, high resolution, good repeatability during light interruption, non-contact, etc., and enables the measurement of the absolute distance without calibration.

It is understood that a particular order or hierarchy of steps in a process disclosed is an example of an exemplary method. Based on design preferences, it is understood that the particular order or hierarchy of steps in the process may be rearranged without departing from the scope of protection of the present disclosure. The attached method claims present elements of the various steps in an exemplary order and are not meant to be limited to the particular order or hierarchy.

In the description of the present disclosure, it should be understood that the orientational or positional relationships indicated by the terms such as "up", "down", "front", "rear", "left", and "right" are based on the orientational or positional relationships shown in the drawings, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. Throughout the drawings, the same elements are represented by the same or similar reference signs. The conventional structure or construction will be omitted when it may cause confusion with the understanding of the present disclosure. Moreover, the shapes, dimensions, and positional relationships of the components in the figures do not reflect the real sizes, proportions, and actual positional relationships.

Similarly, in the above description of the exemplary embodiments of the present disclosure, the various features of the present disclosure are sometimes grouped together in a single embodiment, diagram, or description thereof, in order to simplify the present disclosure and to help understand one or more of the various aspects disclosed. A reference term such as "one embodiment", "some embodiments", "an example", "a specific example", or "some examples" is described to mean that a specific feature, structure, material, or characteristic described in connection with the embodiment or example is included in at least one embodiment or example of the present disclosure. In this specification, the indicative representation of the above terms does not necessarily refer to the same embodiments or examples. Moreover, the described specific features, structures, materials, or characteristics can be combined in an appropriate manner in any one or more embodiments or examples.

In addition, the terms "first" and "second" are used for descriptive purposes only, and should not be understood as an indication or implication of relative importance or an implicit indication of the number of the indicated technical features. Therefore, a feature defined with the terms "first" and "second" may explicitly or implicitly include one or more such features. In the description of the present disclosure, "a plurality of (multiple)" means at least two, for example two or three or more, unless otherwise expressly and specifically defined. In addition, the word "a/an" or "one" preceding an element does not exclude the existence of a plurality of such elements. Unless otherwise stated, the expression "approximately", "about", "substantially", or "around" means being within 10% and, preferably, within 5%.

The objects, technical solutions, and beneficial effects of the present disclosure have been described in further detail in the specific embodiments described above. It should be understood that the above description is only illustrative of the specific embodiments of the present disclosure and is not intended to limit the present disclosure. Any modifications, equivalent alternatives, improvements, and so on made within the spirit and principles of the present disclosure shall be encompassed within the scope of protection of the present disclosure.

What is claimed is:

1. An F-P sensor probe, comprising a first N+1-core multimode optical fiber probe, an optical fiber sleeve, an imaging lens group, and a reference lens, wherein:
   the first N+1-core multimode optical fiber probe, the imaging lens group, and the reference lens are sequentially fixed inside the optical fiber sleeve along a direction of the F-P sensor probe toward a sample; and
   the first N+1-core multimode optical fiber probe comprises N first multimode optical fibers and one second multimode optical fiber, where N≥2, and the N first multimode optical fibers are arranged around the second multimode optical fiber;
   wherein when a surface of the sample has a reflectivity greater than or equal to 40%, the F-P sensor probe further comprises a film layer inside a window, and the film layer inside the window is attached to a surface of the reference lens.

2. The F-P sensor probe according to claim 1, wherein the film layer inside the window is a metal film layer with a transmittance of 40%±5% and a reflectivity of 15%±5%, and preferably, the metal film layer comprises a metallic chromium layer with a thickness of 4 to 8 nm.

3. The F-P sensor probe according to claim 1, wherein the reference lens is quartz glass with a thickness greater than or equal to 5 mm and a PV of the surface topography less than or equal to $\lambda/20$, where $\lambda$ is a wavelength at which an interferometer measures the surface topography of the reference lens.

4. The F-P sensor probe according to claim 1, wherein the second multimode optical fiber is disposed at a central position of the first N+1-core multimode optical fiber probe, and the N first multimode optical fibers are arranged annularly at an equal spacing $\Delta d_1$ around the second multimode optical fiber.

5. The F-P sensor probe according to claim 4, wherein each of the N first multimode optical fibers is in a tangential relationship to the second multimode optical fiber.

6. The F-P sensor probe according to claim 1, wherein both a core diameter $d_1$ of the first multimode optical fibers and a core diameter $d_2$ of the second multimode optical fiber are standard core diameters, and $d_2$ is greater than or equal to $d_1$; and
   a spacing $\Delta d_1$ between two adjacent first multimode optical fibers satisfies $0 \leq \Delta d_1 \leq d_1/2$.

7. The F-P sensor probe according to claim 6, wherein the number of the first multimode optical fibers is determined according to a following formula:

$$N = \frac{\pi}{\arccos\left(\frac{d_1 + \Delta d_1}{d_1 + d_2}\right)}$$

where N is the number of the first multimode optical fibers.

8. An absolute distance measurement device using the F-P sensor probe according to claim 1, comprising:
   the F-P sensor probe, an F-P sensor connector, a second N+1-core multimode optical fiber, a 1×2 optical fiber coupler, a N-core multimode optical fiber, a single-core multimode optical fiber, an illuminating fiber connector, a receiving fiber connector, an illuminating light source, and a demodulating system,
   wherein the first N+1-core multimode optical fiber probe of the F-P sensor probe is connected to the F-P sensor connector;
   one end of the F-P sensor connector that is far away from the F-P sensor probe is connected sequentially with the second N+1-core multimode optical fiber and a first end of the 1×2 optical fiber coupler, and a second end of the 1×2 optical fiber coupler is connected to the N-core multimode optical fiber and the single-core multimode optical fiber, respectively; and
   the N-core multimode optical fiber is connected to the illuminating fiber connector, the single-core multimode optical fiber is connected to the receiving fiber connector, the illuminating fiber connector is connected to the illuminating light source, the receiving fiber connector is connected to the demodulating system, the illuminating light source is configured to emit a light, and the demodulating system is configured to obtain an absolute distance between the sample and the F-P sensor probe.

9. The absolute distance measurement device according to claim 8, wherein the first multimode optical fibers in the F-P sensor probe are linked with the illuminating fiber connector; and the second multimode optical fiber in the F-P sensor probe is linked with the receiving fiber connector.

10. The absolute distance measurement device according to claim 8, wherein the illuminating light source comprises a halogen light source, an LED, an SLD, and a supercontinuum laser light source; and the demodulating system comprises a spectrometer and an fiber optic F-P demodulator and is configured to acquire and analyze interference light intensity signals at different distances.

11. An absolute distance measurement method using the absolute distance measurement device according to claim 8, comprising steps of:

providing an input light path, in which the light emitted from the illuminating light source is coupled into a branch where the illuminating fiber connector is located, exits through the N first multimode optical fibers in the first N+1-core multimode optical fiber probe into the F-P sensor probe, and then converges in an air gap between the reference lens and the sample;

providing a reflected light path, in which light rays are reflected by surfaces of the reference lens and the sample and then pass through the F-P sensor probe again, converge, for a second time, through the second multimode optical fiber in the first N+1-core multimode optical fiber probe, and finally reach the receiving fiber connector; and providing a distance calculating module to analyze an optical signal received by the receiving fiber connector and calculate the absolute distance between the sample and the F-P sensor probe.

12. The absolute distance measurement method according to claim 11, wherein the providing an input light path comprises steps of:

causing the light emitted from the illuminating light source to be coupled into the illuminating fiber connector, then pass sequentially through the N-core multimode optical fiber, the 1×2 optical fiber coupler, and the second N+1-core multimode optical fiber to the F-P sensor probe, exit from the N first multimode optical fibers in the first N+1-core multimode optical fiber probe, then be transmitted sequentially through the imaging lens group and the reference lens, and then converge, for a first time, in the air gap between the reference lens and the sample.

13. The absolute distance measurement method according to claim 11, wherein the providing a reflected light path comprises steps of:

causing the light reflected by the surfaces of the reference lens and the sample to be transmitted sequentially through the reference lens and the imaging lens group, and then converged, for the second time, at the second multimode optical fiber in the first N+1-core multimode optical fiber probe and coupled into the second multimode optical fiber; and causing the optical signal carrying information on the absolute distance in the air gap to pass sequentially through the second N+1-core multimode optical fiber, the 1×2 optical fiber coupler, and the single-core multimode optical fiber and then reach the receiving fiber connector.

14. The absolute distance measurement method according to claim 11, wherein the providing a distance calculating module comprises steps of:

receiving and analyzing the optical signal by the demodulating system to obtain a thickness of the air gap between the reference lens and the sample, so as to obtain the absolute distance between the sample and the F-P sensor probe.

15. The absolute distance measurement method according to claim 14, wherein the absolute distance between the sample and the F-P sensor probe is calculated by using following operations:

regarding the reference lens and the sample as an F-P cavity according to a theory of the multi-beam interference with a parallel-plate, and computing a reflection coefficient of the F-P cavity;

computing a simulated reflectivity of the F-P cavity from the reflection coefficient, and establishing a model library of simulated reflectivities of the F-P cavity corresponding to the air gap at different thicknesses;

computing an actually measured reflectivity of the F-P cavity; and performing an operation of cross-correlating the actually measured reflectivity with a plurality of simulated reflectivities in the model library, and determining a thickness of the air gap corresponding to a simulated reflectivity with a highest correlation as the absolute distance between the sample and the F-P sensor probe.

16. The absolute distance measurement method according to claim 15, wherein the reflection coefficient of the F-P cavity is computed according to a following formula:

$$\tilde{r}^t = \frac{r_1^t + r_1^t r_2^t e^{-2i\delta_1}}{1 + r_1^t r_2^t e^{-2i\delta_1}} (t = s, p)$$

in the formula, s and p represent a s-wave and a p-wave, respectively; $r_1^t$ represents a reflection coefficient at an interface between the reference lens and the air gap corresponding to a t-wave; $r_2^t$ represents a reflection coefficient at an interface between the air gap and the sample corresponding to the t-wave; $\delta_1$ represents a phase shift of the light in the reference lens and in the air gap due to a change in optical path; and $\tilde{r}^t$ represents the reflection coefficient of the F-P cavity corresponding to the t-wave, wherein $r_1^t$, $r_2^t$ (t=s, p) is computed according to following formulas:

$$r_m^s = \frac{n_{m-1} \cos\theta_{m-1} - n_m \cos\theta_m}{n_{m-1} \cos\theta_{m-1} + n_m \cos\theta_m} (m = 1, 2)$$

$$r_m^p = \frac{n_m \cos\theta_{m-1} - n_{m-1} \cos\theta_m}{n_m \cos\theta_{m-1} + n_{m-1} \cos\theta_m} (m = 1, 2)$$

in the formula, $n_0$, $n_1$, and $n_2$ represent refractive indices of the reference lens, the air gap, and the sample, respectively; $\theta_0$ and $\theta_1$ represent an incident angle and a refraction angle of an incident light emitted from the first multimode optical fibers on a lower surface of the reference lens, respectively; $\theta_2$ represents an angle of refraction of the incident light on an upper surface of the sample; and $r_m^s$ and $r_m^p$ represent reflection coefficients of the s-wave and the p-wave at an interface between two media with refractive indices of $n_{m-1}$ and $n_m$ in a case where light beams are obliquely incident thereon, respectively.

17. The absolute distance measurement method according to claim 15, wherein a film layer inside the window is attached to a surface of the reference lens, and the reflection coefficient of the F-P cavity is computed according to a following formula:

$$\tilde{r}^t = \frac{r_1^t + r_1^t r_2^t r_3^t e^{-2i\delta_2} + r_2^t e^{-2i\delta_1} + r_3^t e^{-2i(\delta_1+\delta_2)}}{1 + r_2^t r_3^t e^{-2i\delta_2} + r_1^t r_2^t e^{-2i\delta_1} + r_1^t r_3^t e^{-2i(\delta_1+\delta_2)}} (t = s, p)$$

in the formula, s and p represent a s-wave and a p-wave, respectively; $r_1^t$ represents a reflection coefficient at an interface between the reference lens and the film layer inside the window corresponding to a t-wave; $r_2^t$ represents a reflection coefficient at an interface between the film layer inside the window and the air gap corresponding to the t-wave; $r_3^t$ represents a reflection coefficient at an interface between the air gap and the sample corresponding to the t-wave; $\delta_1$ and $\delta_2$ represent phase shifts of the light in the film layer inside the window and in the air gap due to a change in optical path, respectively; and $\tilde{r}^t$ represents the reflection coefficient of the F-P cavity corresponding to the t-wave, wherein
$r_1^t$, $r_2^t$, $r_3^t$ (t=s, p) is computed according to following formulas:

$$r_m^s = \frac{n_{m-1} \cos \theta_{m-1} - n_m \cos \theta_m}{n_{m-1} \cos \theta_{m-1} + n_m \cos \theta_m} (m = 1, 2, 3)$$

$$r_m^p = \frac{n_m \cos \theta_{m-1} - n_{m-1} \cos \theta_m}{n_m \cos \theta_{m-1} + n_{m-1} \cos \theta_m} (m = 1, 2, 3)$$

in the formula, $n_0$, $n_1$, $n_2$, and $n_3$ represent refractive indices of the reference lens, the film layer inside the window, the air gap, and the sample, respectively; $\theta_0$ and $\theta_1$ represent an incident angle and a refraction angle of an incident light emitted from the first multi-mode optical fibers on an upper surface of the film layer inside the window, respectively; $\theta_2$ represents an angle of refraction of the incident light on a lower surface of the film layer inside the window; $\theta_3$ represents an angle of refraction of the incident light on an upper surface of the sample; and $r_m^s$ and $r_m^p$ represent reflection coefficients of the s-wave and the p-wave at an interface between two media with refractive indices of $n_{m-1}$ and $n_m$ in a case where light beams are obliquely incident thereon, respectively.

18. The absolute distance measurement method according to claim 15, wherein the simulated reflectivity of the F-P cavity is computed according to a following formula:

$$R_{sim} = \frac{1}{2}(|\tilde{r}^s|^2 + |\tilde{r}^p|^2)$$

where $R_{sim}$ represents the simulated reflectivity of the F-P cavity; and $\tilde{r}^s$ and $\tilde{r}^p$ represent reflection coefficients of the F-P cavity for the s-wave and the p-wave, respectively.

19. The absolute distance measurement method according to claim 15, wherein the actually measured reflectivity of the F-P cavity is computed according to a following formula:

$$R_{exp} = \frac{I_{sample} - I_{dark}}{I_{ref} - I_{dark}} \cdot R_{ref}$$

where $R_{exp}$ represents the actually measured reflectivity of the F-P cavity; $I_{sample}$ represents an intensity of reflected light from the sample; $I_{dark}$ represents an intensity of stray light; $I_{ref}$ represents a reference light intensity; and $R_{ref}$ represents a reflectivity correction coefficient, wherein
$R_{ref}$ is computed by a following formula:

$$R_{ref} = r_{12} + t_{12}^2 \cdot r'$$

where $r_{12}$ and $t_{12}$ represent a reflection coefficient and a transmission coefficient of the reference lens, respectively; and r' represents a reflection coefficient at an interface between the air gap and the sample.

\* \* \* \* \*